Mar. 20, 1923.  1,449,320
J. J. HAYS
LOCKING DEVICE
Filed Nov. 25, 1921   2 sheets-sheet 2
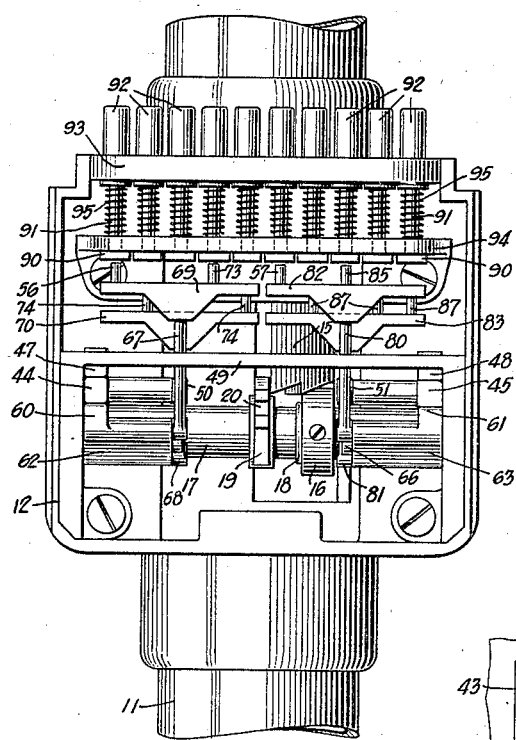
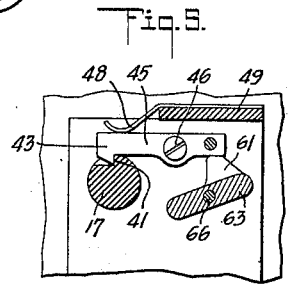
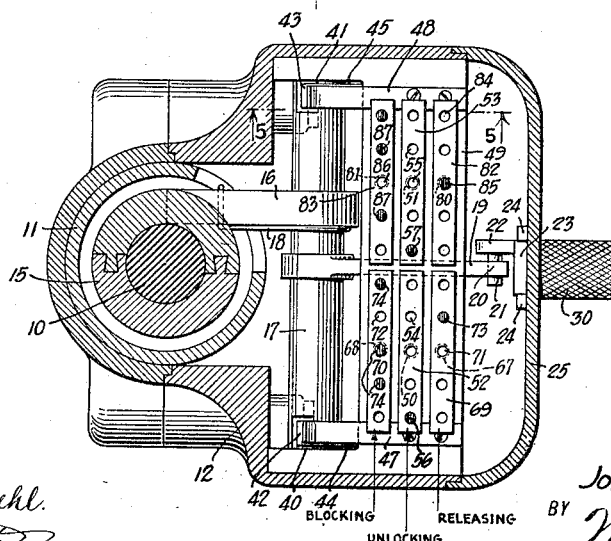
WITNESSES
Frederick Diehl.
Rev. G. Hoster.
INVENTOR
JOHN J. HAYS.
BY Munn & Co.
ATTORNEYS Patented Mar. 20, 1923.

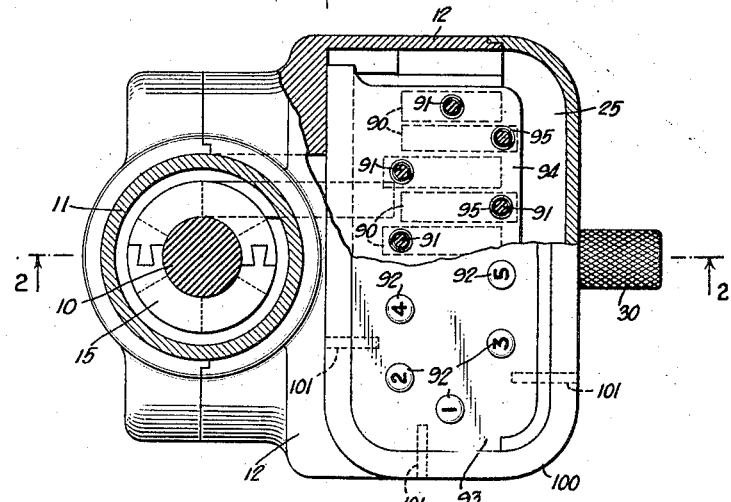

1,449,320

UNITED STATES PATENT OFFICE.

JOHN J. HAYS, OF NEW YORK, N. Y.

LOCKING DEVICE.

Application filed November 25, 1921. Serial No. 517,637.

*To all whom it may concern:*

Be it known that I, JOHN J. HAYS, a citizen of the United States, and a resident of the city of New York (Whitestone, borough of Queens), in the county of Queens and State of New York, have invented a new and Improved Locking Device, of which the following is a full, clear, and exact description.

The invention relates to locking devices such as shown and described in the Letters Patent of the United States, No. 1,241,914, granted to George Brasler on October 2, 1917.

The object of the invention is to provide a new and improved locking device arranged to securely lock the steering mechanism of an automobile or other power driven vehicle to prevent an unauthorized person from running away with the vehicle. Another object is to permit the manufacturer of the locking device to greatly vary the combinations of the locking devices so that practically the combinations are all unlike.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1 is a plan view of the improved locking device as applied to the steering shaft of an automobile, parts being shown in section;

Figure 2 is a sectional side elevation of the same on the line 2—2 of Figure 1;

Figure 3 is a front elevation of the improved locking device with the casing front removed;

Figure 4 is a sectional plan view of the same on the line 4—4 of Figure 2;

Figure 5 is a sectional side elevation of a blocking member in blocking position relative to the corresponding locking member, the section being on the line 5—5 of Figure 4; and Figure 6 is a face view of a portion of the casing front.

The improved locking device is shown applied to a steering shaft 10 extending through a housing or post 11 on which is secured the sectional casing 12 of the locking device. On the steering shaft 10 is secured a ratchet wheel 15 adapted to be engaged by a dog 16 secured on a shaft 17 journaled in suitable bearings arranged in the casing 12. A spring 18 is attached at one end to the shaft 17 and engages with its other end the dog 16 to normally hold the latter in engagement with the ratchet wheel 15. On the shaft 17 is secured an arm 19 terminating in a fork 20 engaged by a pin 21 held on a lug 22 formed on the inner face of a slide 23 mounted to slide up and down in a guideway 24 formed on the inner face of the removable front 25 of the casing 12. On the slide 23 is secured a handle 26 projecting through a slot 27 formed in the front 25 of the casing 12, and the said slot is provided with enlarged ends 28 and 29, as plainly shown in Figure 6. On the handle 26 is mounted to slide a tubular knob 30 having a reduced inner end 31 adapted to be seated in either of the enlarged ends 28 or 29 of the slot 27. It is understood that the handle 26 is adapted to pass through the slot 27 into either of the enlarged ends 28, 29, but the reduced end 31 of the knob 30 is larger in diameter than the width of the slot 27 and hence cannot pass through the same. Now in order to shift the slide 23 up or down it is necessary to move the knob 30 outward a distance sufficient for the reduced end 31 to move out of the corresponding end 28 or 29 of the slot 27 to allow of raising or lowering the slide 23 by moving the knob 30 up or down as the case may be. The slide 23 is locked in lowermost or uppermost position by pushing the knob 30 inward to engage the reduced end 31 with the corresponding end 28 or 29 of the slot 27. The knob 30 is held in innermost position by the action of a spring 32 coiled on the handle 26 and seated at its inner end on a shoulder 33 formed on the knob 30. The outer end of the spring 32 abuts against the head of a screw 34 secured to the outer end of the handle 26. The head of the screw 34 fits into the outer end of the knob 30 to close the same and to form an outer bearing for the knob. It is understood that when the slide 23 is in lowermost position, as shown in Figure 2, then the dog 16 is in engagement with the ratchet wheel 15 to lock the steering shaft 10 against turning, and when the slide 23 is in raised position the dog 16 is out of engagement with the ratchet wheel 15 to allow of turning the steering shaft 10 for steering the vehicle in the usual manner.

The shaft 17 is provided near its end with lengthwise extending alined shoulders 40 and 41 adapted to be engaged by hook ends 42 and 43 of locking levers 44 and 45 fulcrumed at 46 on the sides of the casing 12. The levers 44 and 45 are pressed on by springs 47 and 48 attached to a shelf 49 forming part of the casing 12. The springs 44 and 45 serve to hold the hook ends 42 and 43 in engagement with the peripheral face of the shaft 17 and to cause the hook ends 42 and 43 to readily snap in behind the shoulders 40 and 41 whenever the shaft 17 is turned into locking position, that is, when the dog 16 is swung upward into engagement with the ratchet wheel 15, as above mentioned. The free ends of the levers 44 and 45 are pivotally connected with upwardly extending rods 50 and 51 mounted to slide in bearings arranged in the shelf 49. The upper ends of the rods 50 and 51 are provided with heads 52 and 53 having sockets 54 and 55 arranged in a longitudinal row, as plainly shown in Figure 4. Any one of the sockets 54 is adapted to be engaged by a pin 56, and a similar pin 57 is adapted to be engaged with any one of the sockets 55 in the head 53.

In order to block the movement of the levers 44 and 45 use is made of blocking members 60 and 61 in the form of lugs mounted on levers 62, 63 fulcrumed at 65 and 66 on the sides of the casing 12. The lever 62 carrying the blocking member 60 is pivotally connected at opposite sides of its fulcrum 65 with upwardly extending rods 67 and 68 slidingly engaging the shelf 49. The upper ends of the rods 67 and 68 terminate in heads 69 and 70 provided with sockets 71 and 72 of which the sockets 71 are arranged in a row, and any one of the said sockets is adapted to be engaged by a removable pin 73. The sockets 72 are likewise arranged in a row and sundry of the said sockets are removably engaged by pins 74. The pins 74 are preferably three in number, as will be readily understood by reference to Figure 4. The ends of the lever 63 carrying the blocking member 61 are pivotally connected with upwardly extending rods 80 and 81 slidingly engaging the shelf 49, and the upper ends of the said rods 80, 81 terminates in heads 82 and 83, of which the head 82 is provided on top with sockets 84 arranged in a row and of which any one of the sockets is adapted to be engaged by a pin 85. The head 83 is provided with a plurality of sockets 86 likewise arranged in a row and sundry of the said sockets are adapted to be engaged by removable pins 87, preferably three in number, as shown in Figure 4. The sockets 54 are arranged in transverse alinement with corresponding sockets 71, 72, and similarly the sockets 55, 84, 86 are similarly arranged in transverse alinement, as will be readily understood by reference to Figure 4. It will further be noticed that the pins 56, 57, 73, 74, 85 and 87 are ten in number and are arranged in different transverse rows of the corresponding sockets in the heads 52, 69, 70, 53, 82 and 83. The pins 56, 57, 73, 74, 85 and 87 are adapted to be engaged by transverse bars 90 arranged on the lower ends of stems 91 of buttons 92 forming part of a keyboard 93 on top of the casing 12. The stems 91 are mounted to slide in a shelf 94 attached to the casing 12 and the said stems are pressed on by springs 95 to hold the buttons 92 normally in uppermost position, that is, to project above the top of the keyboard 93 to enable the operator in charge of the vehicle to press the said buttons downward with a view to move the corresponding bars 90 into engagement with the pins 56, 57, 73, 74, 85 and 87 with which they are in register. The ten buttons 92 are preferably provided with indicating characters such as consecutive numerals from 1 to 10, as indicated in Figure 1.

The operation is as follows:

Normally the dog 16 is out of engagement with the ratchet wheel 15, and the hook ends 42 and 43 of the locking levers 44 and 45 are out of engagement with the shoulders 40 and 41, and the blocking members 60 and 61 are out of blocking position relative to the said levers 44 and 45. The steering shaft 10 can readily be turned by the driver in order to steer the vehicle in the desired direction. When it is desired to lock the steering shaft 10 against turning by unauthorized persons then the operator in charge of the vehicle slides the knob 30 outward to disengage the reduced end 31 thereof from the upper end 29 of the slot 27 to unlock the slide 23 and thus enable the operator to push the knob 30 downward and with it the slide 23 to move the dog 16 into engagement with the ratchet wheel 15 and to allow the hooks 42 and 43 of the levers 44 and 45 to snap into engagement with the shoulders 40 and 41 to lock the shaft 17 against return movement. It is understood that after the slide 23 has been moved into lowermost position it is locked therein by the operator releasing the knob 30 to allow the latter to slide inward by the action of its spring 32 to engage the reduced end 31 with the lower end of the slot 28. The operator of the vehicle next presses any one of the buttons 92 marked 2, 3 and 5 and either of the buttons marked 7, 9 and 10 to push the heads 70 and 83 downward thereby causing their rods 80 and 81 to impart swinging movements to the levers 62 and 63 to move the blocking members 60 and 61 into blocking engagement with the locking levers 44 and 45 to prevent the said locking levers from swinging out of locking engagement with the shoulders 40 and 41 of the shaft 17. From the foregoing it will be seen that in order to unlock the shaft 17 it will be necessary first to reset the blocking members 60 and 61, that is, to move the same into non-blocking position relative to the locking levers 44 and 45, and in order to do so it is necessary to press the proper buttons 92 to move the levers 62 and 63 into releasing position. As shown in the drawings, the buttons 92 marked 4 and 8 must be pressed simultaneously to move the blocking members 60 and 61 into releasing position. Next it is necessary to press the buttons 92 marked 1 and 6 simultaneously to swing the locking levers 44 and 45 out of locking engagement with the shoulders 40 and 41 of the shaft 17, and then the operator unlocks the slide 23 and moves the same upward to impart a swinging motion to the shaft 17 with a view to move the dog 16 out of engagement with the ratchet wheel 15, after which the slide 23 is locked in uppermost position by engaging the end 31 of the knob 30 with the upper enlarged end 29 of the slot 27.

As a large number of buttons 92 are provided it is practically impossible for an unauthorized person to press the proper buttons in the proper sequence in order to unlock the shaft 17. It will be noticed that the several pins 56, 57, 73, 74, 85 and 87 can be readily rearranged in their corresponding sockets to enable the manufacturer of the locking device to change the combination of the locking devices manufactured by him so that practically no two combinations are alike. In practice the pins 56, 57, 73, 74, 85 and 87 are screwed in the sockets to prevent accidental displacement thereof but to allow the manufacturer to change the positions of the pins according to the desired combinations. In practice the casing is sealed by the use of a ring 100 permanently fastened by rivets 101 or other fastening devices to the casing to hold the front 25 against removal therefrom.

Although I have shown and described the locking device applied to the steering shaft of an automobile or similar vehicle, it is evident that the locking device may be applied to other parts to be locked, it being understood that the ratchet wheel 15 is attached to the part to be locked.

Having thus described my invention, I claim as new and desire to secure by Letters Patent:—

1. In a locking device, a locking lever, a blocking lever for the same, an actuating device for the said locking lever and provided with a selective member adapted to be set into a selected position, a blocking and releasing device for the said locking lever, an actuating blocking device for moving the said blocking and releasing device into the blocking position and provided with a plurality of selective members adapted to be set in selected positions, an actuating releasing device for moving the said blocking and releasing device into releasing position, and finger pieces controlling the said selective members.

2. In a locking device, a locking lever, a blocking lever for the same, an actuating device for the said locking lever and provided with a selective member adapted to be set into a selected position, a blocking and releasing device for the said locking lever, an actuating blocking device for moving the said blocking and releasing device into blocking position and provided with a plurailty of selective members adapted to be set in selected positions, an actuating releasing device for moving the said blocking and releasing device into releasing position, and a keyboard having finger-pieces each provided with means adapted to engage a corresponding selective member.

3. In a locking device, a locking lever, a blocking lever for blocking and releasing the said locking lever, rods operatively connected with the locking and blocking levers, each rod having a head provided with a row of sockets, pins removably engaging sundry of the said sockets, and a keyboard having finger pieces each provided with a bar extending across the said heads to engage a corresponding pin in register with the bar.

4. In a locking device, a locking lever, a locking lever rod connected with the said locking lever and having a head provided with a row of sockets, a pin removably seated in one of the said sockets, a blocking lever adapted to engage the said locking lever to hold the latter against movement, blocking lever rods operatively connected with the said blocking lever at opposite sides of its fulcrum, the said blocking lever rods having heads each provided with a row of sockets, pins removably seated in sundry of the said sockets in the heads of the blocking lever rods, and a keyboard having finger-pieces each provided with a bar extending across the said heads to engage a corresponding pin in register with the bar.

5. In a locking device, a locking lever, a locking lever rod connected with the said locking lever and having a head provided with a row of sockets, a pin removably seated in one of the said sockets, a blocking lever adapted to engage the said locking lever to hold the latter against movement, blocking lever rods operatively connected with the said blocking lever at opposite sides of its fulcrum, the said blocking lever rods having heads each provided with a row of sockets, one of the blocking lever rods being adapted to move the blocking lever into blocking position and the other blocking lever rod being adapted to move the blocking lever into release position, a plurality of pins removably held in sundry of the said sockets in the head of the blocking lever rod for blocking a single pin removably held in one of the said sockets in the head of the blocking lever for releasing, and a keyboard having fingerpieces and provided with a bar extending across the said heads to engage a corresponding pin in register with the bar.

6. In a locking device, a locking lever, a slide pivotally connected with the said locking lever to move the latter into locking or unlocking position, a handle on the said slide and provided with a slidable knob and a plate having a slot provided with enlarged portions at the ends, the said handle extending through the slot and the said knob being adapted to be seated in either of the enlarged ends of the slot to lock the slide against movement.

JOHN J. HAYS.